(12) United States Patent
Koh et al.

(10) Patent No.: US 9,664,943 B2
(45) Date of Patent: May 30, 2017

(54) DISPLAY DEVICE AND DRIVING METHOD OF THE SAME

(71) Applicant: Samsung Display Co., Ltd., Yongin, Gyeonggi-Do (KR)

(72) Inventors: Jai-Hyun Koh, Seoul (KR); Se Ah Kwon, Seoul (KR); Heen Dol Kim, Yongin-si (KR); Kuk-Hwan Ahn, Hwaseong-si (KR); Ik Soo Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 228 days.

(21) Appl. No.: 14/102,384

(22) Filed: Dec. 10, 2013

(65) Prior Publication Data
US 2014/0204321 A1    Jul. 24, 2014

(30) Foreign Application Priority Data

Jan. 11, 2013   (KR) .......................... 10-2013-0003440

(51) Int. Cl.
*G02F 1/1335*   (2006.01)
*G09G 3/36*   (2006.01)

(52) U.S. Cl.
CPC ..... *G02F 1/133514* (2013.01); *G09G 3/3648* (2013.01); *G02F 2201/52* (2013.01); *G09G 3/3614* (2013.01); *G09G 2300/0452* (2013.01); *G09G 2320/0242* (2013.01)

(58) Field of Classification Search
CPC ......... G09G 2300/0452; G09G 3/2074; G09G 3/3233; G09G 2300/0439
See application file for complete search history.

(56) References Cited

U.S. PATENT DOCUMENTS

| | | | |
|---|---|---|---|
| 7,787,702 B2 * | 8/2010 | Brown Elliott | G06T 5/009 345/589 |
| 7,995,019 B2 | 8/2011 | Ben-David et al. | |
| 8,018,476 B2 * | 9/2011 | Credelle | G09G 3/2074 345/690 |
| 2009/0102769 A1 * | 4/2009 | Kouno | G09G 3/3648 345/88 |
| 2012/0001947 A1 | 1/2012 | Chu-Ke et al. | |
| 2012/0206512 A1 | 8/2012 | Kim et al. | |

(Continued)

FOREIGN PATENT DOCUMENTS

| | | |
|---|---|---|
| CN | 102162950 A | 8/2011 |
| EP | 2 525 344 | 11/2012 |

(Continued)

OTHER PUBLICATIONS

European Search Report corresponding to EP 14150844.0, 7 pages.

*Primary Examiner* — Jennifer Mehmood
*Assistant Examiner* — Parul Gupta
(74) *Attorney, Agent, or Firm* — Innovation Counsel LLP

(57) ABSTRACT

The present invention provides a display device including a first block including a first primary color pixel and a second primary color pixel having substantially a same area, a second block alternatingly disposed with the first block along the first direction, the second block including a third primary color pixel, a fourth primary color pixel and a white pixel. The first block and the second block have substantially a same area and the third primary color pixel has an area wider than the fourth primary color pixel and the white color pixel.

19 Claims, 8 Drawing Sheets

(56) References Cited

U.S. PATENT DOCUMENTS

2012/0257821 A1 10/2012 Saito et al.
2012/0313842 A1 12/2012 Phan et al.

FOREIGN PATENT DOCUMENTS

| | | |
|---|---|---|
| JP | 2010-271736 | 12/2010 |
| JP | 2010-277095 | 12/2010 |
| JP | 2011-008190 | 1/2011 |
| JP | 2011-091483 | 6/2011 |
| KR | 10-2007-0071183 | 7/2007 |
| KR | 10-2007-0081001 | 8/2007 |
| KR | 10-2009-0046277 | 5/2009 |
| KR | 10-2011-0001887 | 1/2011 |
| KR | 10-1072375 | 10/2011 |
| KR | 10-2012-0026878 | 3/2012 |
| KR | 10-2012-0070221 | 6/2012 |
| KR | 10-2012-0081018 | 7/2012 |
| TW | 201217875 | 5/2012 |

* cited by examiner

DISPLAY DEVICE AND DRIVING METHOD OF THE SAME

CROSS-REFERENCE TO RELATED APPLICATION

This application claims priority to and the benefit of Korean Patent Application No. 10-2013-0003440 filed in the Korean Intellectual Property Office on Jan. 11, 2013, the entire contents of which are incorporated herein by reference.

BACKGROUND (a) Technical Field

Embodiments of the present invention relate to a display device and a driving method.

(b) Description of the Related Art

To increase light transmission efficiency in a liquid crystal display, a display device having an RGBW pixel structure, adding a white pixel to red, green, and blue pixels, has been suggested. Compared to a conventional RGB pixel structure, the RGBW pixel structure shows a light transmission efficiency of more than double the conventional RGB pixel structure such that power consumption of the RGBW pixel structure may be largely reduced. Accordingly, this structure may be appropriately applied to a mobile device.

However, while adding the white pixel, relative areas of the other color pixels are reduced such that the simultaneous contrast ratio is simultaneously deteriorated. That is, the RGB pixel structure has a yellow luminance of about 90% compared with the white luminance. However, in the RGBW pixel structure, the yellow luminance is only about 45% compared with the white luminance such that color quality is deteriorated.

The above information disclosed in this Background section is only for enhancement of understanding of the technical background and therefore it may contain information that does not form the prior art that is already known in this country to a person of ordinary skill in the art.

SUMMARY

An exemplary embodiment of the present invention provides a display device having high luminance and excellent color quality.

A display device according to an exemplary embodiment of the present invention may include a first block including a first primary color pixel and a second primary color pixel having substantially a same area, a second block alternatingly disposed with the first block along the first direction, the second block including a third primary color pixel, a fourth primary color pixel and a white pixel. The first block and the second block have substantially a same area and the third primary color pixel has an area wider than the fourth primary color pixel and the white color pixel.

The first primary color pixel may be a red pixel, the second primary color pixel may be a green pixel, the third primary color pixel may be one of a yellow, a cyan and a magenta pixel, and the fourth primary color pixel may be a blue pixel.

An area of the third primary color pixel may be more than 50% of that of the second block.

The first primary color pixel and the second primary color pixel may be elongated along a second direction perpendicular to the first direction and the third primary color pixel may be elongated along the first direction.

The fourth primary color pixel and the white pixel may have substantially a same area.

The first block and the second block may be alternatingly disposed along a second direction.

The display device may further include a gate lines including a first gate line, a second gate line, a third gate line, and a data lines including a first data line, second data line, a third data line, a fourth data line and a fifth data line. A first block row is disposed between the first gate line and a second gate line and a second block row is disposed between the second gate line and the third gate line. One of the first primary color pixel and the second primary color pixel is disposed between the first data line and the second data line, the other of the first primary color pixel and the second primary color pixel is disposed between the second data line and the third data line, the third primary color pixel is disposed between the third data line and the fifth data line, one of the fourth primary color pixel and the white pixel is disposed between the fourth data line and the fifth data line, and the other of the fourth primary color pixel and the white pixel is disposed between the fourth data line and the fifth data line. The first primary color pixel, the second primary color pixel and the third primary color pixel in a first block row are connected to the second data line, the third data line and the fourth data line, respectively. One of the fourth primary color pixel and the white pixel in a first block row is connected to the fourth data line and the other of the fourth primary color pixel and the white pixel in a first row is connected to the fifth data line. The first primary color pixel, the second primary color pixel and the third primary color pixel in a second block row are connected to the fourth data line, the fifth data line and the first data line, respectively. One of the fourth primary color pixel and the white pixel in a second block row is connected to the first data line, and the other of the fourth primary color pixel and the white pixel in a second row is connected to the second data line. Odd numbered data lines supply a positive data voltage with respect to a common voltage and even numbered data lines supply a negative data voltage with respect to the common voltage.

A driving method of a display device according to an exemplary embodiment of the present invention may be applied to a display device including a plurality of red pixels, a plurality of green pixels, a plurality of blue pixels, a plurality of white pixels, and a plurality of fifth pixels emitting a different color from the red pixel, the green pixel, the blue pixel, and the white pixel, and the method includes applying an image signal voltage for the fifth pixel of a predetermined position and fifth pixels disposed in four diagonal directions with respect to the fifth pixel of the predetermined position to have opposite polarities.

The image signal voltage may be applied to the plurality of red pixels, the plurality of green pixels, the plurality of blue pixels, and the plurality of white pixels for the pixel of a predetermined position and pixels disposed in four diagonal directions with respect to the pixel of the predetermined position to have opposite polarities for each color.

The display device may further include a plurality of gate lines extending in a first direction and a plurality of data lines extending in a second direction, and when a region occupied by the red pixel and the green pixel adjacent to each other is referred to as a first block and a region occupied by the blue pixel, the white pixel, and the fifth pixel is referred to as a second block, the first block and the second block may be alternately disposed in a right and left direction thereby forming a block row, and may be alternately disposed in an up and down direction thereby forming a block column, first to third gate lines may be disposed for the first block row and the second block row adjacent to each other, the first gate line may be connected to the red pixel, the green pixel, the blue pixel, and the white pixel of the first block row, the second gate line may be connected to the blue pixel and the white pixel of the second block row and the fifth pixel of the first block row, the third gate line may be connected to the fifth pixel, the red pixel, and the green pixel of the second block row, the red pixel, the green pixel, the blue pixel, and the white pixel of the first block row may be connected to the data line disposed at the right side thereof, the fifth pixel of the first block row may be connected to the data line crossing it, the red pixel, the green pixel, the blue pixel, the white pixel, and the fifth pixel of the second block row may be connected to the data line disposed at the left side thereof, and data lines adjacent to each other may be applied with a signal voltage of a polarity opposite to each other.

According to an exemplary embodiment of the present invention, the yellow, cyan, or magenta pixel compensates the luminance deterioration of the different pixels due to the white pixel such that the display quality of the display device may be improved.

DETAILED DESCRIPTION OF THE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A pixel layout view of a display device according to an exemplary embodiment of the present invention will be described with reference to FIG. 1.

Figure 1:
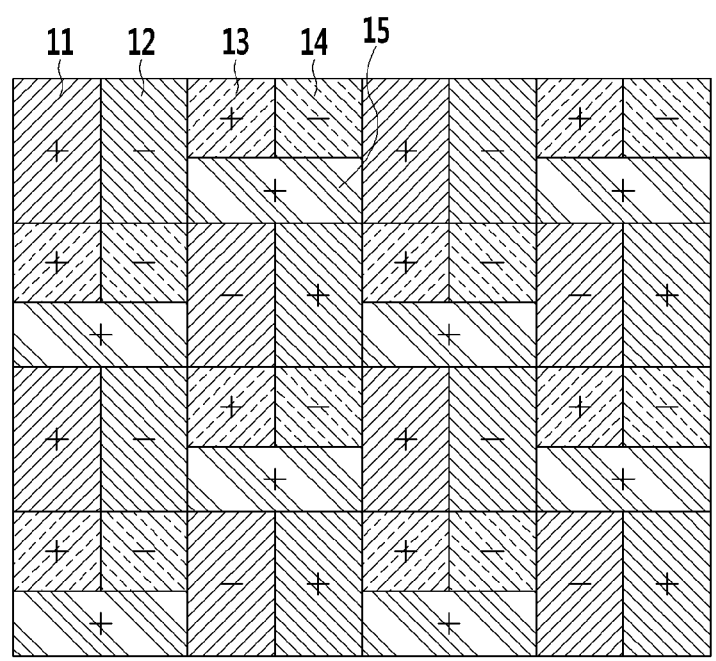
FIG. 1 is a pixel layout view of a display device according to an exemplary embodiment of the present invention.

FIG. 1 is a pixel layout view of a display device according to an exemplary embodiment of the present invention.

Referring to FIG. 1, a display device according to an exemplary embodiment of the present invention includes a yellow pixel 15 as well as a red pixel 11, a green pixel 12, a blue pixel 13, a white pixel 14. The red pixel 11 and the green pixel 12 have a vertically long rectangular shape, the blue pixel 13 and the white pixel 14 have a shape near a square while reducing a length of a vertical direction compared with the red pixel 11 and the green pixel 12, and the yellow pixel 15 has a horizontally long rectangular shape. The yellow pixel 15 is disposed in a space formed by reducing the length of the vertical direction of the blue pixel 13 and the white pixel 14. The position and the shape of the yellow pixel 15 may be variously changed. For example, the yellow pixel 15 may be disposed with a vertically long rectangular shape in a space formed by reducing a horizontal width of the white pixel 14 or the blue pixel 13. Also, the shape of the yellow pixel 15 may be variously changed along with the shapes of the red pixel 11, the green pixel 12, the blue pixel 13, and the white pixel 14.

When a region occupied by the red pixel 11 and the green pixel 12 is referred to as a first block and a region occupied by the blue pixel 13, the white pixel 14, and the yellow pixel 15 is referred to as a second block, the first block and the second block may have a shape near a square. The first block and the second block may have the vertically or horizontally long rectangular shape. Also, the first block and the second block may have different sizes. In the present exemplary embodiment, the first block and the second block are alternately disposed in the horizontal direction thereby forming a block row, and are also alternately disposed in the vertical direction thereby forming a block column. Accordingly, the second blocks are disposed at the upper/lower and right/left sides of the first block, and the first blocks are disposed at the upper/lower and right/left sides of the second block.

Figure 2:
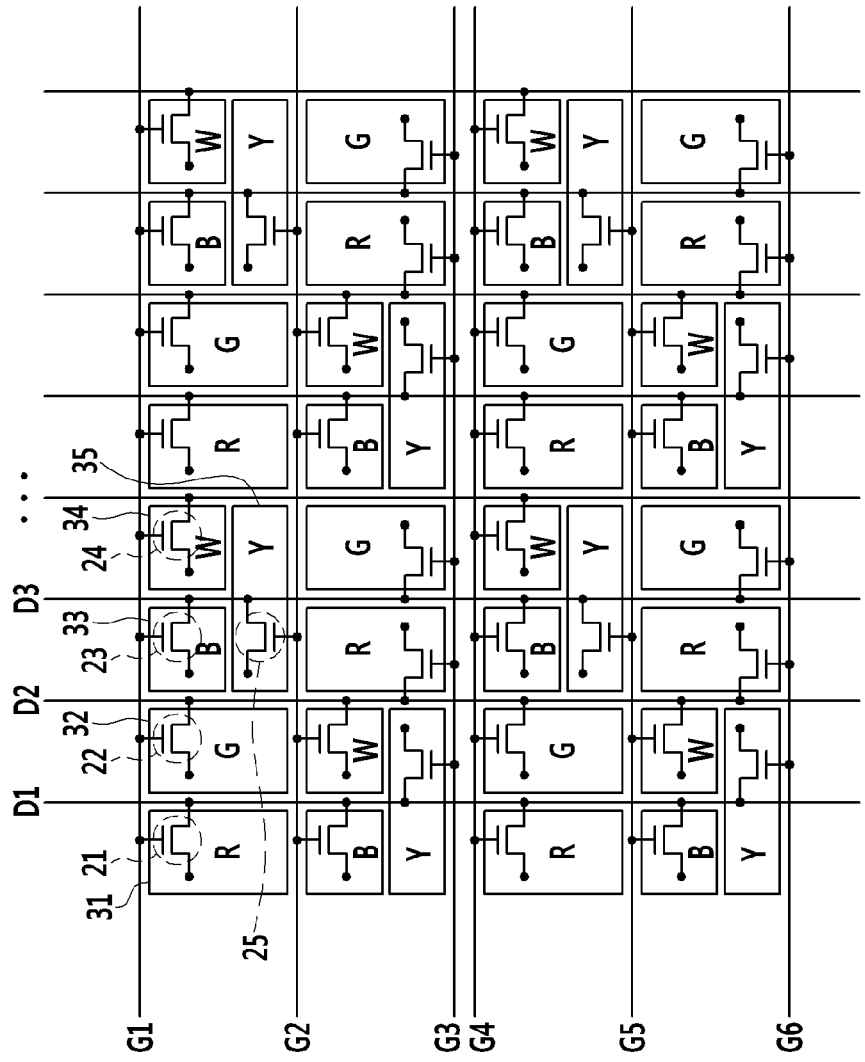
FIG. 2 is a layout view of a connection relation of a thin film transistor, a gate line, and a data line in the display device of FIG. 1.

Referring to FIG. 2, a connection relation of a thin film transistor, a gate line, and a data line will be described in a display device according to an exemplary embodiment of the present invention.

FIG. 2 is a layout view of a connection relation of a thin film transistor, a gate line, and a data line in the display device of FIG. 1. In FIG. 2, for a simplification, pixel electrodes in a first bloc row 31, 32, 33, 34, 35 are shown to be quadrangular, and only switching thin film transistors in a first block row 21, 22, 23, 24, 25, gate lines G1, G2, G3, . . . and data lines D1, D2, D3, . . . are shown among several constituent elements of the pixel.

Referring to FIG. 2, three gate lines G1, G2, G3, . . . are disposed per every two block rows, and two data lines D1, D2, . . . are disposed per every one block column. Two gate lines Gland G3 are disposed at an upper side and a lower side of the two block rows, respectively and one gate line G2 is disposed between the two block rows. The data lines D1, D2, D3, . . . are disposed at the right side of the red pixel 11, the green pixel 12, the blue pixel 13, and the white pixel 14. The odd numbered data lines D1, D3, . . . disposed at the right side of the red pixel 11 and the blue pixel 13 cross the pixel electrode 35 of the yellow pixel 15 formed along the horizontal direction.

The gate line G1 disposed at the upper side of the two block rows is connected to the red pixel 11, the green pixel 12, the blue pixel 13, and the white pixel 14 in the first block row. That is, the gate line G1 disposed at the upper side of the two block rows is connected to a control terminal (a gate electrode) of the thin film transistors for the red pixel 21, the green pixel 22, the blue pixel 23, and the white pixel 24 in the first block row. The gate line G2 disposed between two block rows is connected to a blue pixel and a white pixel in the second block row and a yellow pixel 15 in the first block row. That is, the gate line G2 disposed between two block rows is connected to the control terminal of the thin film transistors for a blue pixel, a white pixel in the second block row and a yellow pixel in the first block row. The gate line G3 disposed at the lower side of the two block rows is connected to a yellow pixel, a red pixel, and a green pixel in the second block row. That is, the gate line G3 disposed at the lower side of two block rows is connected to the control terminal of the thin film transistor of a yellow pixel, a red pixel, and a green pixel in the second block row.

The red pixel 11, the green pixel 12, the blue pixel 13, and the white pixel 14 in the first block row are connected to the data lines D1, D2, D3 and D4 . . . disposed at the right side of the pixels, respectively. That is, the source terminal of the thin film transistors 21, 22, 23, and 24 of the red pixel 11, the green pixel 12, the blue pixel 13, and the white pixel 14 are connected to the data lines D1, D2, D3 and D4 disposed at the right side, respectively. The drain terminal is connected to each of the pixel electrodes 31, 32, 33, and 34. The blue pixel and the white pixel in the second block row are connected to the data lines D1 and D2 disposed at the right side, respectively. That is, the source electrodes of the thin film transistors of the blue pixel and the white pixel in the second block row are connected to the data lines D1 and D2 disposed at the right side, respectively. The drain terminals of a thin film transistor in the blue pixel and the white pixel in the second block row are connected to each of the pixel electrodes. The red pixel and the green pixel in the second block row are connected to the data lines D3 and D4 disposed at the left side of the pixels. That is, the source electrodes of the thin film transistors of the red pixel and the green pixel in the second block row are connected to the data lines D2 and D3 disposed at the left side of the pixels. The drain terminals of the red pixel and the green pixel in the second block row are connected to each of the pixel electrodes. The yellow pixel is connected to odd numbered data lines D1 and D3 crossing the yellow pixel itself in the vertical direction. That is, the source electrode of the thin film transistor of the yellow pixel is connected to the data lines D1 and D3 crossing the yellow pixel electrode in the vertical direction, and the drain electrode of the yellow pixel is connected to the yellow pixel electrode.

In the above, the exemplary embodiment including the yellow pixel 15 as well as the red pixel 11, the green pixel 12, the blue pixel 13, and the white pixel 14 was described. However a cyan pixel or a magenta pixel instead of the yellow pixel 15 may be included.

In the display device of this structure, if column inversion driving is performed, the polarity of the pixel is arranged as shown in FIG. 1. That is, an image signal voltage having opposite polarities is applied to the neighboring data lines.

As described above, if the yellow pixel, the cyan pixel, or the magenta pixel is disposed as well as the red pixel, the green pixel, the blue pixel, and the white pixel, the yellow pixel, the cyan pixel, or the magenta pixel compensates the luminance deterioration of the other color pixels due to the white pixel, thereby improving the display quality of the display device.

Figure 3:
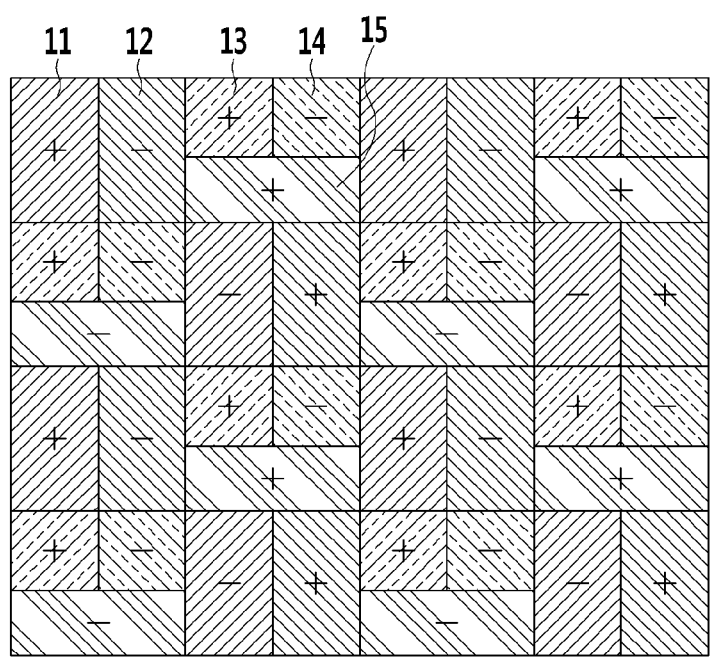
FIG. 3 is a pixel layout view of a display device according to another exemplary embodiment of the present invention.
Figure 4:
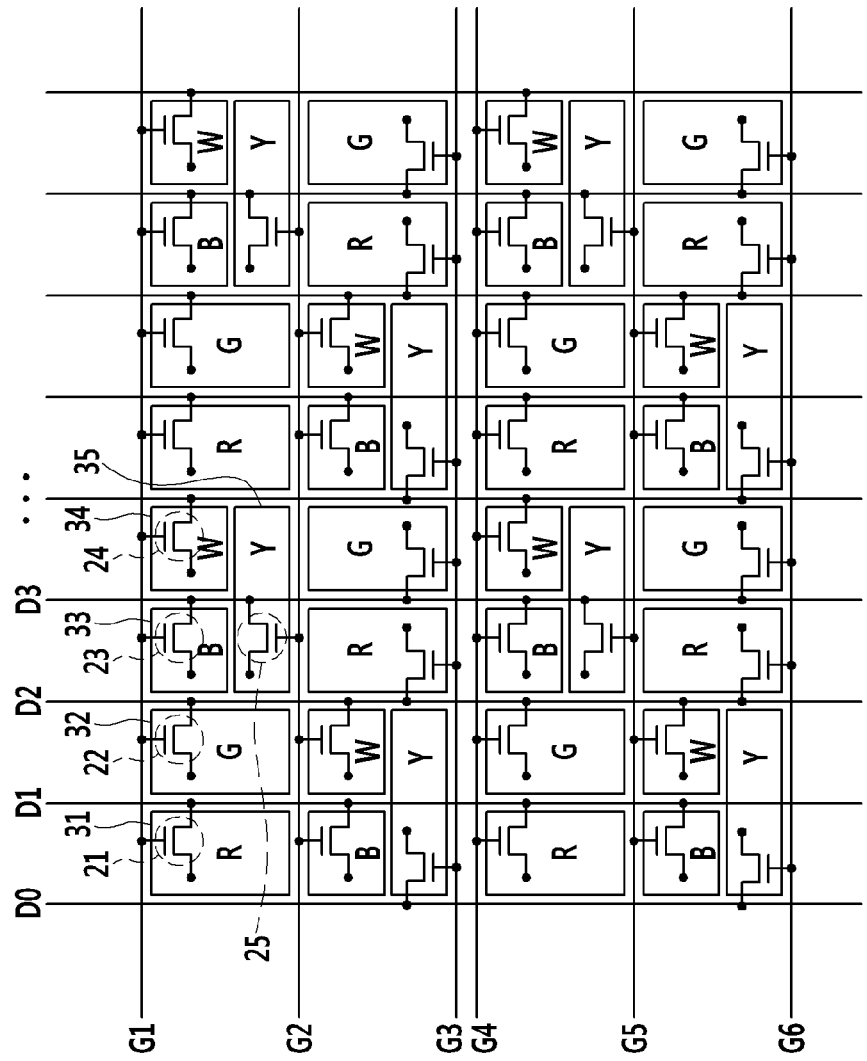
FIG. 4 is a layout view of a connection relation of a thin film transistor, a gate line, and a data line in the display device of FIG. 3.

FIG. 3 is a pixel layout view of a display device according to another exemplary embodiment of the present invention, and FIG. 4 is a layout view of a connection relation of a thin film transistor, a gate line, and a data line in the display device of FIG. 3.

The display device of FIG. 3 and FIG. 4 includes a different connection state of the thin film transistor for the yellow (or the cyan or magenta) pixel and the data lines D0, D3, . . . from the display device of FIG. 1 and FIG. 2, and thereby the polarity arrangement of the yellow (or the cyan or magenta) pixel 15 is changed.

In the display device of FIG. 3 and FIG. 4, the data line D0 of the left side of the first pixel column is additionally disposed. The thin film transistor of the yellow pixel in the odd-numbered block column is connected to the data line D0 disposed at the left side of the yellow pixel, and the thin film transistor 25 of the yellow pixel 15 included in the even-numbered block column is connected to the data line D3 crossing it in the horizontal direction.

In the display device of the this structure, if column inversion driving is performed, as shown in FIG. 3, the yellow pixel 15 of the positive polarity and the yellow pixel 15 of the negative polarity are uniformly and symmetrically distributed on the entire screen.

Figure 5:
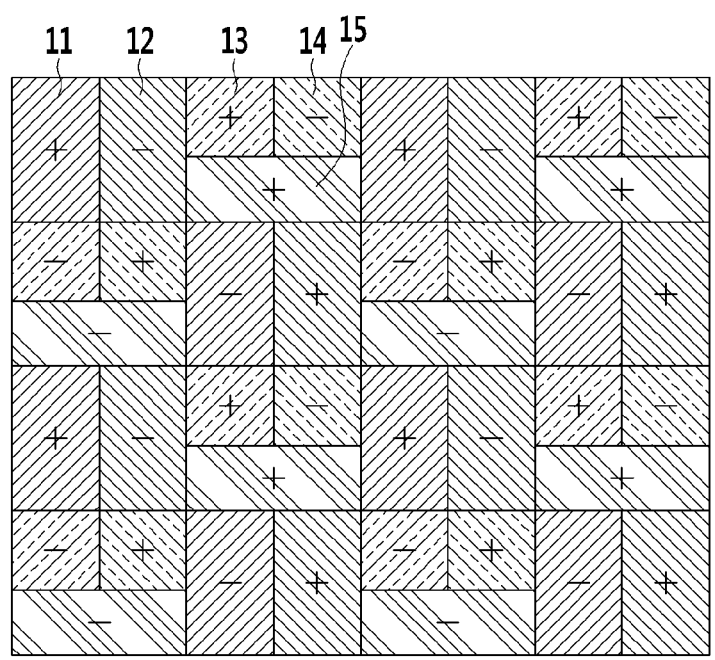
FIG. 5 is a pixel layout view of a display device according to another exemplary embodiment of the present invention.
Figure 6:
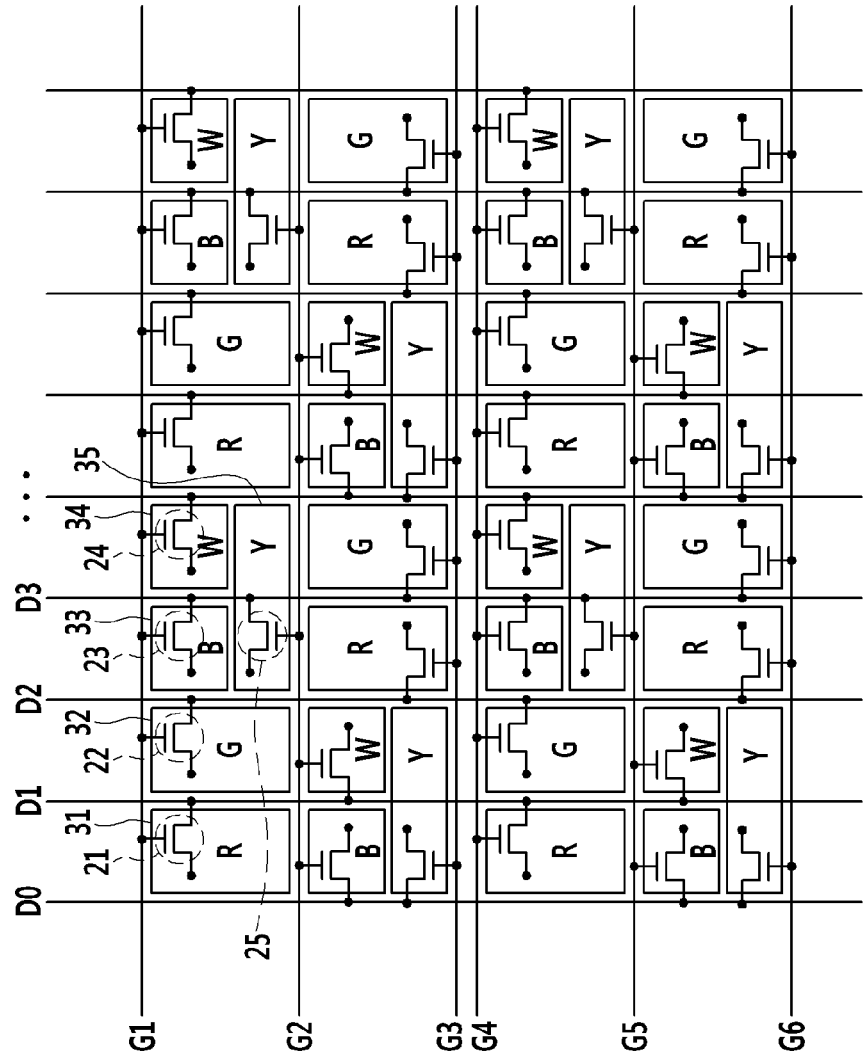
FIG. 6 is a layout view of a connection relation of a thin film transistor, a gate line, and a data line in the display device of FIG. 5.

FIG. 5 is a pixel layout view of a display device according to another exemplary embodiment of the present invention, and FIG. 6 is a layout view of a connection relation of a thin film transistor, a gate line, and a data line in the display device of FIG. 5.

The display device of FIG. 5 and FIG. 6 includes a different connection state of the blue pixel 13 and the white pixel 14 included in the even-numbered block row and the data lines D0 and D1 from the display device of FIG. 3 and FIG. 4, and thereby the polarity arrangement of the blue pixel 13 and the white pixel 14 is changed.

In the display device of FIG. 5 and FIG. 6, the thin film transistors of the blue pixel and the white pixel included in the even-numbered block columns are respectively connected to the data lines D0 and D1 disposed at the left side thereof, and the thin film transistors of the blue pixel and the white pixel in the even-number block columns are respectively connected to the data lines D3 and D4 disposed at the right side thereof.

In the display device of the this structure, if the column driving is performed, as shown in FIG. 5, the blue pixel and the white pixel 14 of the positive polarity and the blue pixel and the white pixel of the negative polarity are uniformly and symmetrically distributed on the entire screen.

Figure 7:
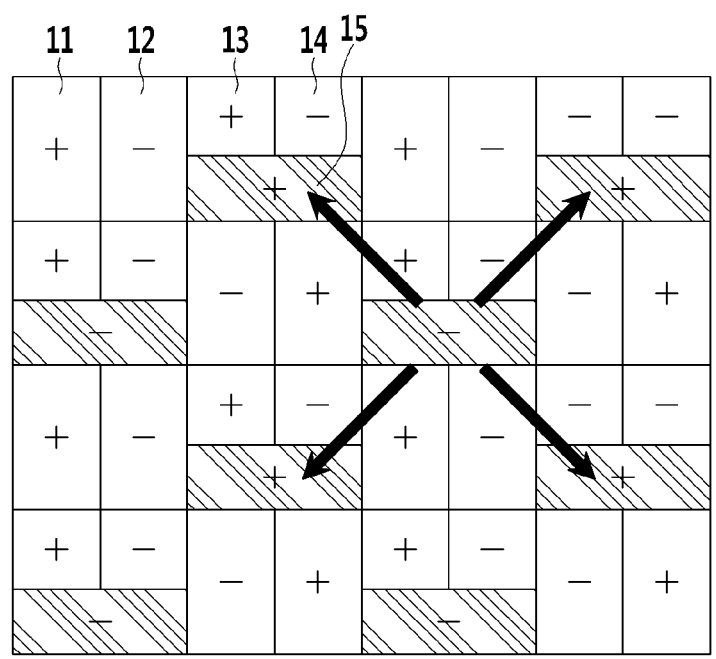
FIG. 7 and FIG. 8 are pixel layout views of a display device according to an exemplary embodiment of the present invention, showing a polarity arrangement of same color pixels.
Figure 8:
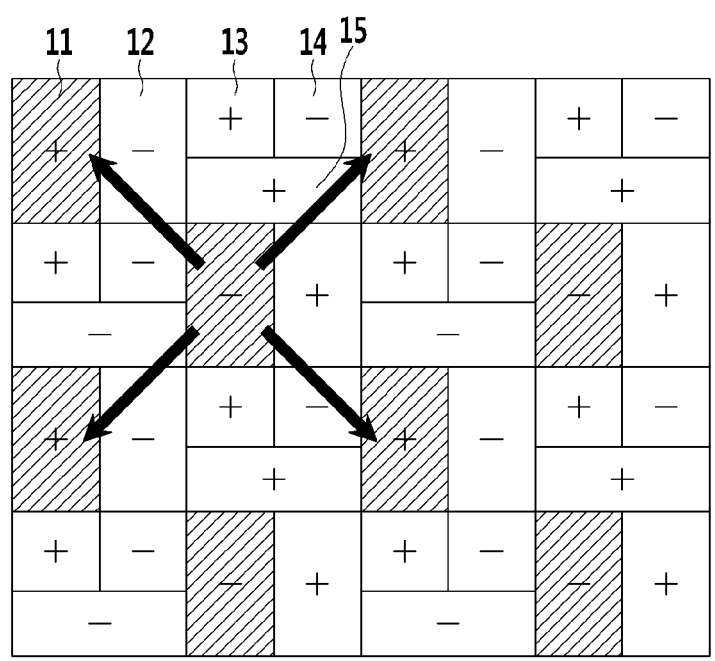

As described above, if the pixels are disposed and the column inversion driving is performed, as shown in FIG. 7 and FIG. 8, the overall polarity arrangement of the red pixel, the green pixel, the blue pixel, the white pixel, and the yellow (or the cyan or magenta) pixel is radial-symmetrical on the entire screen such that the display deterioration such as a flicker of a longitudinal or a transverse line may be prevented. That is, for each color, the polarity of the pixel of any one position is driven to be opposite to the polarity of the pixels disposed in the four diagonal directions such that the display quality may be improved.

Table 1 below shows a change of a luminance ratio (Y/W) of a white color and a yellow color according to an area of a yellow pixel when applying an exemplary embodiment of the present invention to the liquid crystal display. A Y area means a ratio of an area occupied by a yellow pixel in the second block of the region occupied with the blue pixel, the white pixel, and the yellow pixel.

TABLE 1

|  | Y area | White luminance | Yellow luminance | Y/W (%) |
|---|---|---|---|---|
| RGB structure |  | 100 | 90 | 90 |
| RGBW structure |  | 200 | 90 | 45 |
| An embodiment of | 1 | 180 | 180 | 100 |
| the present | 0.9 | 182 | 171 | 94 |
| invention | 0.8 | 184 | 162 | 88 |
|  | 0.7 | 186 | 153 | 82 |
|  | 0.6 | 188 | 144 | 77 |
|  | 0.5 | 190 | 135 | 71 |
|  | 0.4 | 192 | 126 | 66 |
|  | 0.3 | 194 | 117 | 60 |
|  | 0.2 | 196 | 108 | 55 |
|  | 0.1 | 198 | 99 | 50 |
|  | 0 | 200 | 90 | 45 |

As shown in Table 1, if the area occupied by the yellow pixel in the second block is more than half, the luminance ratio (Y/W) of the yellow color for the while color is over 70%. However, a human eye recognizes a yellow degradation when the luminance ratio (Y/W) of the yellow color for the white color is less than 70%. Accordingly, to prevent this, it may be determined that the area occupied with the yellow pixel in the second block is more than half.

The described display device may be applied to an organic light emitting device or a plasma display device as well as the liquid crystal display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising;
   a first block including a first primary color pixel and a second primary color pixel having substantially a same area;
   a second block alternatingly disposed with the first block along the first direction, the second block including a third primary color pixel which includes one of a yellow, a cyan and a magenta pixels, a fourth primary color pixel and a white pixel; and
   data lines including a first data line and a second data line,
   wherein the first block and the second block have substantially a same area and the third primary color pixel has an area wider than the fourth primary color pixel and the white color pixel,
   wherein an area of the third primary color pixel is the same with the sum of the fourth primary color pixel area and the white color pixel area of the second block, and
   wherein one of the fourth primary color pixel and the white pixel in the second block is connected to the first data line, and the other of the fourth primary color pixel and the white pixel in the second block is connected to the second data line.

2. The display device of claim 1, wherein the first primary color pixel is a red pixel, the second primary color pixel is a green pixel, and the fourth primary color pixel is a blue pixel.

3. The display device of claim 2, wherein the area of the third primary color pixel is more than 50% of that of the second block.

4. The display device of claim 3, wherein the first primary color pixel and the second primary color pixel is elongated along a second direction perpendicular to the first direction and the third primary color pixel is elongated along the first direction.

5. The display device of claim 4, wherein the fourth primary color pixel and the white pixel have substantially a same area.

6. The display device of claim 5, wherein the first block and the second block are alternatingly disposed along a second direction.

7. The display device of claim 6, further comprising:
   gate lines including a first gate line, a second gate line, a third gate line, and
   data lines further including a third data line, a fourth data line and a fifth data line,
   wherein a first block row is disposed between the first gate line and a second gate line and a second block row is disposed between the second gate line and the third gate line,
   wherein one of the first primary color pixel and the second primary color pixel is disposed between the first data line and the second data line, the other of the first primary color pixel and the second primary color pixel is disposed between the second data line and the third data line, the third primary color pixel is disposed between the third data line and the fifth data line, one of the fourth primary color pixel and the white pixel is disposed between the third data line and the fourth data line, and the other of the fourth primary color pixel and the white pixel is disposed between the fourth data line and the fifth data line,
   wherein the first primary color pixel, the second primary color pixel and the third primary color pixel in the first block row are connected to the second data line, the third data line and the fourth data line, respectively,
   wherein one of the fourth primary color pixel and the white pixel in the first block row is connected to the fourth data line and the other of the fourth primary color pixel and the white pixel in the first row is connected to the fifth data line,
   wherein the first primary color pixel, the second primary color pixel and the third primary color pixel in the second block row are connected to the fourth data line, the fifth data line and the first data line, respectively, and
   wherein one of the fourth primary color pixel and the white pixel in the second block row is connected to the first data line, and the other of the fourth primary color pixel and the white pixel in the second row is connected to the second data line, and
   wherein a polarity of a data voltage supplied to odd numbered data lines is opposite to a polarity of a data voltage supplied to even numbered data lines.

8. The display device of claim 3, wherein the fourth primary color pixel and the white pixel have substantially a same area.

9. The display device of claim 8, wherein the first block and the second block are alternatingly disposed along a second direction.

10. The display device of claim 3, wherein the first block and the second block are alternatingly disposed along a second direction.

11. The display device of claim 2, wherein the first primary color pixel and the second primary color pixel is elongated along a second direction perpendicular to the first direction and the third primary color pixel is elongated along the first direction.

12. The display device of claim 11, wherein the fourth primary color pixel and the white pixel have substantially a same area.

13. The display device of claim 12, wherein the first block and the second block are alternatingly disposed along a second direction.

14. The display device of claim 13, further comprising:
   a gate lines including a first gate line, a second gate line, a third gate line, and
   a data lines including a first data line, second data line, a third data line, a fourth data line and a fifth data line,
   wherein a first row of the first block and the second block is disposed between the first gate line and a second gate line, and a second row of the first block and the second block is disposed between the second gate line and the third gate line,
   wherein the first primary color pixel is disposed between the first data line and the second data line, the second primary color pixel is disposed between the second data line and the third data line, the third primary color pixel is disposed between the third data line and the fifth data line, one of the fourth primary color pixel and a white color pixel is disposed between the third data line and the fourth data line, and the other of the fourth primary color pixel and a white color pixel is disposed between the fourth data line and the fifth data line, wherein the first primary color pixel, the second primary color pixel and the third primary color pixel in the first row are connected to the second data line, the third data line and the fourth data line, respectively, wherein one of the fourth primary color pixel and the white color pixel in the first row is connected to the fourth data line and the other of the fourth primary color pixel and the white color pixel in the first row is connected to the fifth data line, wherein the first primary color pixel, the second primary color pixel and the third primary color pixel in the second row are connected to the third data line, the fourth data line and the first data line, respectively, and wherein a polarity of a data voltage supplied to odd numbered data lines is opposite to a polarity of a data voltage supplied to even numbered data lines.

15. The display device of claim 11, wherein the first block and the second block are alternatingly disposed along a second direction.

16. The display device of claim 2, wherein the fourth primary color pixel and the white pixel have substantially a same area.

17. The display device of claim 16, wherein the first block and the second block are alternatingly disposed along a second direction.

18. The display device of claim 17, further comprising:
- a gate lines including a first gate line, a second gate line, a third gate line, and
- a data lines including a first data line, second data line, a third data line, a fourth data line and a fifth data line,
- wherein a first row of the first block and the second block is disposed between the first gate line and a second gate line, and a second row of the first block and the second block is disposed between the second gate line and the third gate line, wherein the first primary color pixel is disposed between the first data line and the second data line, the second primary color pixel is disposed between the second data line and the third data line, the third primary color pixel is disposed between the third data line and the fifth data line, one of the fourth primary color pixel and a white color pixel is disposed between the third data line and the fourth data line, and the other of the fourth primary color pixel and a white color pixel is disposed between the fourth data line and the fifth data line, wherein the first primary color pixel, the second primary color pixel and the third primary color pixel in the first row are connected to the second data line, the third data line and the fourth data line, respectively, wherein one of the fourth primary color pixel and the white color pixel in the first row is connected to the fourth data line and the other of the fourth primary color pixel and the white color pixel in the first row is connected to the fifth data line, wherein the first primary color pixel, the second primary color pixel and the third primary color pixel in the second row are connected to the third data line, the fourth data line and the first data line, respectively, wherein one of the fourth primary color pixel and the white color pixel in the second row is connected to the first data line and the other of the fourth primary color pixel and the white color pixel in the second row is connected to the second data line, and wherein a polarity of a data voltage supplied to odd numbered data lines is opposite to a polarity of a data voltage supplied to even numbered data lines.

19. The display device of claim 2, wherein the first block and the second block are alternatingly disposed along a second direction.

* * * * *